United States Patent
Blom

(10) Patent No.: US 6,294,882 B1
(45) Date of Patent: Sep. 25, 2001

(54) CIRCUIT ARRANGEMENT WITH IMPROVED POWER-FACTOR FOR FEEDING A DISCHARGE LAMP

(75) Inventor: Anton Cornelis Blom, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/568,930

(22) Filed: May 11, 2000

(30) Foreign Application Priority Data

May 14, 1999 (EP) .................................................. 99201514

(51) Int. Cl.[7] .................................................. H05B 41/16
(52) U.S. Cl. .......................... 315/246; 315/247; 315/224; 315/209 R; 315/291

(58) Field of Search ................................. 315/246, 200 R, 315/206, 247, 209 R, 219, 224, 225

(56) References Cited

U.S. PATENT DOCUMENTS 5,712,536 * 1/1998 Hass et al. ............................ 315/247
6,118,225 * 9/2000 Wessels ................................ 315/247

* cited by examiner

*Primary Examiner*—Don Wong
*Assistant Examiner*—Tuyet T. Vo

(57) ABSTRACT

A half-bridge circuit which is operated as a double down-converter is equipped with a second inductor and power feedback capacitors and diodes. The power factor of the circuit is substantially improved thereby.

4 Claims, 1 Drawing Sheet

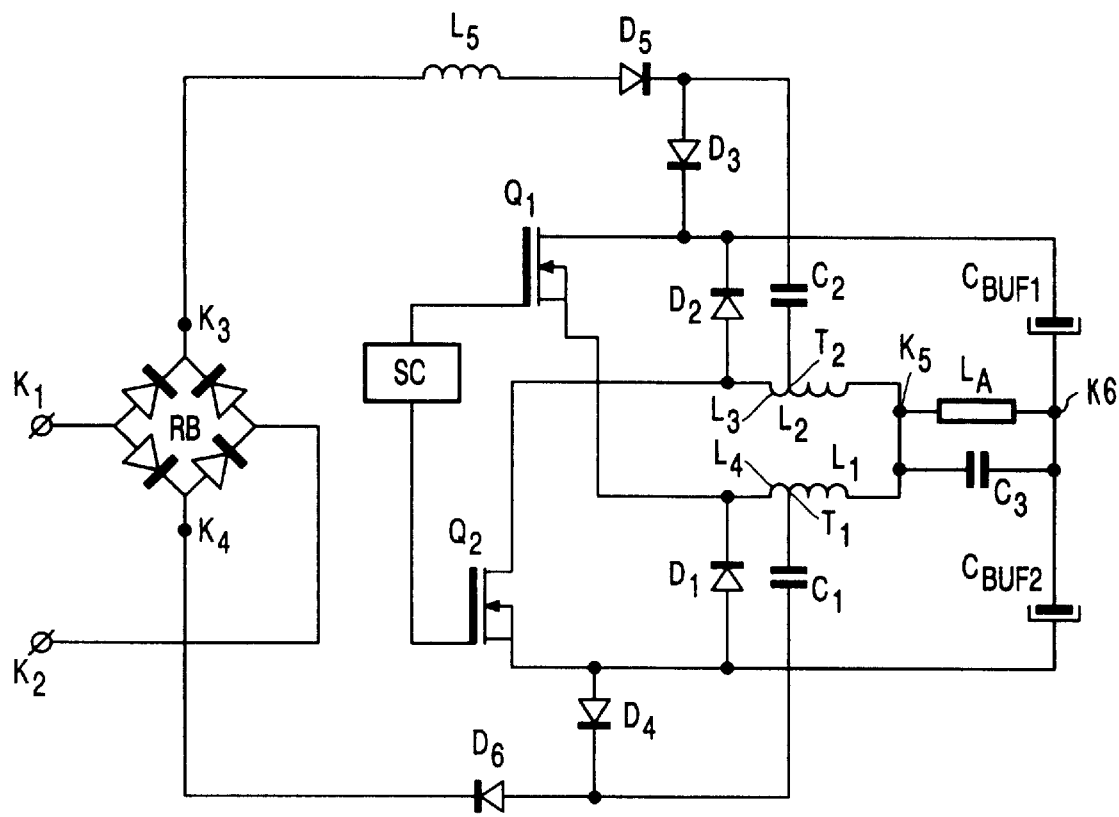

CIRCUIT ARRANGEMENT WITH IMPROVED POWER-FACTOR FOR FEEDING A DISCHARGE LAMP

The invention relates to a circuit arrangement for feeding a discharge lamp, comprising input terminals to be connected to a power supply source supplying a low-frequency alternating voltage, rectifier means coupled to the input terminals for rectifying the low-frequency alternating voltage, and provided with a first output terminal and a second output terminal, a first branch which comprises a series arrangement of a first buffer capacitance and a second buffer capacitance, and which interconnects said output terminals, a load branch which comprises a series arrangement of a first inductive element and clamps for holding a discharge lamp, and a first end of which is coupled to a common point of the two buffer capacitances, a first switching element coupled to the load branch, a second switching element coupled to the load branch, a control circuit coupled to a control electrode of the first switching element and to a control electrode of the second switching element for rendering the first switching element alternately conducting and non-conducting, while the second switching element is non-conducting, and for rendering the second switching element alternately conducting and non-conducting, while the first switching element is non-conducting, a first unidirectional element and a second unidirectional element coupled to the load branch.

Such a circuit arrangement is well known. The known circuit arrangement is a full half bridge. The lamp current generated by the known circuit arrangement is a low-frequency square-wave alternating current. During a first half period of the low-frequency square-wave alternating current, the control circuit renders the first switching element alternately conducting and non-conducting with a frequency which is much higher than that of the low-frequency alternating current, while the second switching element is maintained non-conducting by the control circuit. As a result thereof, a part of the components, namely the first switching element, the first inductive element and the first unidirectional element, of the full half bridge circuit function as a down-converter type DC-DC converter. As a result, the lamp current during this first half period of the low-frequency square-wave alternating current is a direct current in a first direction with a substantially constant amplitude. During a second half period of the low-frequency square-wave alternating current, the control circuit renders the second switching element alternately conducting and non-conducting with a frequency which is much higher than that of the low-frequency direct current, and the first switching element is maintained non-conducting. During this second half period, the second switching element, the second unidirectional element and the first inductive element jointly form a down-converter type DC-DC converter. As a result, the lamp current during the second half period of the low-frequency square-wave alternating current is a direct current of substantially constant amplitude in a second direction opposed to the first direction. It has been found that the low-frequency square-wave alternating current yields a favorable lamp operation without visible flicker, particularly in the case of HID lamps, while also the electrodes of the lamp are uniformly loaded. A drawback of the known circuit arrangement resides in that the circuit arrangement almost only takes current from the voltage supply source if the alternating current supplied by the voltage supply source has a high amplitude. As a result, the known circuit arrangement has a low power factor.

It is an object of the invention to provide a circuit arrangement with which a discharge lamp can be fed by means of a low-frequency square-wave current, and which circuit arrangement has a relatively high power factor.

To achieve this, a circuit arrangement as mentioned in the opening paragraph is characterized in accordance with the invention in that the circuit arrangement is further provided with a third unidirectional element coupled between the first output terminal and the first buffer capacitance, a fourth unidirectional element coupled between the second output terminal and the second buffer capacitance, a second inductive element a first end of which is coupled to a first end of the first inductive element, which end faces the lamp clamps, a first capacitive element coupled between a first tapping point of the first conductive element and the second output terminal, a second capacitive element coupled between a tapping point of the second inductive element and the first output terminal, and wherein the first switching element is coupled between a second end of the first inductive element and a common point of the third unidirectional element and the first buffer capacitance, wherein the second switching element is coupled between a second end of the second inductive element and a common point of the fourth unidirectional element and the second buffer capacitance, and wherein the first unidirectional element is coupled between the second end of the first inductive element and a common point of the fourth unidirectional element and the second buffer capacitance, and the second unidirectional element is coupled between the second end of the second inductive element and a common point of the third unidirectional element and the first buffer capacitance.

The first and the second capacitive element serve as power feedback capacitors. If the first switching element is rendered alternately conducting and non-conducting with a frequency f1 by the control circuit, the first capacitance is charged with the same frequency by means of a current supplied by the supply voltage source and, subsequently, discharged by means of a current charging the first buffer capacitance. If the second switching element is rendered alternately conducting and non-conducting with a frequency f1 by the control circuit, the second capacitance is charged with the same frequency by means of a current supplied by the supply voltage source and, subsequently, discharged by means of a current charging the first buffer capacitance. As a result thereof, current is continuously taken from the supply voltage source and hence the circuit arrangement has a relatively high power factor. During the second half period of the low-frequency square-wave current, the second inductive element in combination with the second switching element and the second unidirectional element form a second downconverter. This second downconverter consists completely of components which differ from the components which, during the first half period of the square-wave low-frequency current, form the first downconverter, namely the first switching element, the first inductive element and the second unidirectional element. This is necessary to bring about the proper power feedback.

In a preferred embodiment of a circuit arrangement in accordance with the invention, a third inductive element is coupled between the first output terminal and the third unidirectional element. This inductive element limits the current with which the first and the second capacitive element are charged and hence also limits the power dissipation in different components of the circuit arrangement.

It has also been found that the performance of the circuit arrangement is further improved if the clamps for holding a discharge lamp are connected to each other by means of a second branch comprising a third capacitive element.

In a further preferred embodiment, a fifth unidirectional element is coupled between the first output terminal and the second capacitive element, and a sixth unidirectional element is coupled between the second output terminal and the first capacitive element. In this further preferred embodiment, the fifth and the sixth unidirectional element are chosen in such a manner that they can become conducting and non-conducting with a frequency f1 without too much power dissipation. In this further preferred embodiment, less high requirements are imposed on the unidirectional elements forming part of the rectifier means.

These and other aspects of the invention will be apparent from and elucidated with reference to the embodiments described hereinafter.

In the drawing:

FIG. 1 diagrammatically shows an example of a circuit arrangement in accordance with the invention to which a discharge lamp is connected.

In FIG. 1, K1 and K2 represent input terminals which are to be connected to a supply voltage source supplying a low-frequency alternating voltage. A diode bridge RB is coupled to the input terminals and provided with a first output terminal K3 and a second output terminal K4. In this example, diode bridge RB forms rectifier means for rectifying the low-frequency alternating voltage. Output terminals K3 and K4 are interconnected by means of a series arrangement of a coil L5, a diode D5, a diode D3, a capacitor Cbuf1, a capacitor Cbuf2, a diode D4 and a diode D6. In this example, this series arrangement forms a first branch. The coil L5 forms a third inductive element in this example. In this example, diodes D3, D4, D5 and D6 form, respectively, a third, a fourth, a fifth and a sixth unidirectional element. Capacitors Cbuf1 and Cbuf2 form, respectively, a first and a second buffer capacitance. The first buffer capacitance Cbuf1 is shunted by a series arrangement of a switching element Q1, a coil L1 and lamp clamps K5 and K6 for holding a discharge lamp. A discharge lamp La is connected to the lamp clamps K5 and K6. The lamp clamps K5 and K6 are interconnected by means of a capacitor C3, which, in this example, forms a second branch and also a third capacitive element. In this example, coil L1 forms a first inductive element. The switching element Q1 forms a first switching element. A tapping point T1 of the coil L1 is connected to a common point of diodes D4 and D6 by means of capacitor C1. The part of the coil L1 situated between a second end of coil L1, facing away from the lamp clamps, and the tapping point is referred to as L4. The capacitor C1 forms a first capacitive element. The diode D1 connects the second end of coil L1 to a common point of diode D4 and capacitor Cbuf2.

The second buffer capacitance Cbuf2 is shunted by a series arrangement of switching element Q2, coil L2 and lamp clamps K5 and K6. In this example, coil L2 forms a second inductive element. The switching element Q2 forms a second switching element. A tapping point T2 of coil L2 is connected, by means of capacitor C2, to a common point of diodes D3 and D5. The part of coil L2 situated between a second end of coil L2, facing away from the lamp clamps, and the tapping point is referred to as L3. The capacitor C2 forms a second capacitive element. The diode D2 connects the second end of coil L2 to a common point of diode D3 and capacitor Cbuf1. The respective control electrodes of switching element Q1 and switching element Q2 are connected to respective outputs of a circuit part SC, which, in this example, forms a control circuit for rendering the first switching element alternately conducting and non-conducting, while the second switching element is non-conducting, and for rendering the second switching element alternately conducting and non-conducting, while the first switching element is non-conducting.

The operation of the example shown in FIG. 1 is as follows.

If the input terminals K1 and K2 are connected to a supply voltage source supplying a low-frequency alternating voltage, this low-frequency alternating voltage is rectified by the diode bridge and a direct voltage is present across the series arrangement of capacitors Cbuf1 and Cbuf2. Through the discharge lamp La flows a square-wave low-frequency alternating current with a frequency f0.

During a first half period of the low-frequency square-wave alternating current, the switching element Q1 is rendered alternately conducting and non-conducting with a frequency f1 by the circuit part SC, while the switching element Q2 is maintained non-conducting by the circuit part SC. During each period associated with the frequency f1, a number of successive operating states of the circuit arrangement can be distinguished. The first operating state starts immediately after the switching element Q1 has been rendered conducting. From the first output terminal K3 flows a first current to the second output terminal K4 via coil L5, diode D5, diode D3, switching element Q1, the part L4 of coil L1, capacitor C1 and diode D6. The capacitor C1 is charged by this first current. At the same time, a second current flows from the capacitor Cbuf1 via the switching element Q1, coil L1 and the parallel arrangement of the discharge lamp La and the capacitor C3 back to the capacitor Cbuf1. The charging of the capacitor C1 by the first current stops when the voltage across the capacitor C1 is approximately equal to the instantaneous value of the output voltage of the diode bridge RB. This also ends the first operating state. In the second operating state, a first current flows from a first end of the coil L5 via diodes D5 and D3, switching element Q1, coil L1, the parallel arrangement of capacitor C3 and discharge lamp La, capacitor Cbuf2, diode D4, diode D6 and diode bridge RB back to a second end of coil L5. During the second operating state, also a second current flows having the same current path as the second current in the first operating state but a smaller amplitude. The second operating state ends when the energy in the coil L5, and hence the amplitude of the first current, have become zero. In the third operating state, a current flows which has the same current path as the second current in the first and the second operating state. The third operating state ends and the fourth operating state starts when the circuit part SC renders the switching element Q1 non-conducting. In the fourth operating state, a current flows from the first end of coil L1 via the parallel arrangement of the discharge lamp La and capacitor C3, capacitor Cbuf2, diode D4 and capacitor C1 back to the tapping point T1 of coil L1. This current discharges capacitor C1 and charges capacitor Cbuf2. When the voltage across capacitor C1 has decreased to approximately zero, the current no longer flows via diode D4 and capacitor C1, but via diode D1. The amplitude of this current becomes zero when the energy in the part of coil L1 between tapping point T1 and the first end of coil L1 has become zero. This ends the fourth operating state. When the circuit part SC subsequently renders the switching element Q1 conducting, the first operating state starts again. During each sequence of the four operating states, capacitor C1 is charged from the supply voltage source and discharged in buffer capacitance Cbuf2. In this manner, it is achieved that, during each sequence, current is taken from the supply voltage source, and that the power factor of the circuit arrangement is relatively high.

During a second half period of the low-frequency alternating current, also four operating states can be distinguished, which are successively passed through with a frequency f1. During a second half period of the low-frequency square-wave alternating current, the switching element Q2 is rendered alternately conducting and non-conducting with a frequency f1 by the circuit part SC, while the switching element Q1 is maintained non-conducting by the circuit part SC. The first operating state starts immediately after the switching element Q2 has been rendered conducting. From the first output terminal K3 flows a first current to the second output terminal K4 via coil LS, diode D5, capacitor C2, the part L3 of coil L2, switching element Q2, diode D4 and diode D6. Capacitor C2 is charged by this first current. At the same time, a second current flows from capacitor Cbuf2 via the parallel arrangement of discharge lamp La and capacitor C3, coil L2 and switching element Q2 back to capacitor Cbuf2. The charging of capacitor C2 by the first current stops when the voltage across the capacitor is approximately equal to the instantaneous value of the output voltage of the diode bridge RB. This also ends the first operating state. In the second operating state, a first current flows from a first end of coil L5 via diode D5, diode D3, capacitor Cbuf1, the parallel arrangement of capacitor C3 and discharge lamp La, coil L2, switching element Q2, diode D4, diode D6 and diode bridge RB back to a second end of coil L5. During the second operating state, also a second current flows which has the same current path as the second current in the first operating state but a smaller amplitude. The second operating state ends when the energy in coil L5, and hence the amplitude of the first current, has become zero. In the third operating state, a current flows which has the same current path as the second current in the first and the second operating state. The third operating state ends and the fourth operating state starts when the circuit part SC renders the switching element Q2 non-conducting. In the fourth operating state, a current flows from the tapping point T2 of coil L2 via capacitor C2, diode D3, buffer capacitor Cbuf1 and the parallel arrangement of discharge lamp La and capacitor C3 back to the first end of coil L2. This current discharges capacitor C2 and charges capacitor Cbuf1. When the voltage across capacitor C2 has decreased to approximately zero, current no longer flows via capacitor C2 and diode D3, but via diode D2. The amplitude of this current becomes zero when the energy in the part of coil L2 between tapping point T2 and the first end of coil L2 has become zero. This ends the fourth operating state. When the circuit part SC subsequently renders the switching element Q2 conducting, the first operating state starts again. During each sequence of the four operating states, capacitor C2 is charged from the supply voltage source and discharged in a buffer capacitance. In this manner, it is achieved that, also in the second half period of the low-frequency square-wave lamp current, during each sequence of four operating states current is taken from the supply voltage source and that the power factor of the circuit arrangement is relatively high.

If the circuit arrangement is fed by means of a mains voltage with a frequency of 50 Hz, in practice f0 is often chosen to be a multiple of 50 Hz, such as 100 Hz or 350 Hz. For f1 a frequency is often chosen which lies above the limit of hearing and below 100 kHz because of EMC. For a practical embodiment of the circuit arrangement as shown in FIG. 1, wherein f0 is chosen to be 100 Hz and f1 is chosen to be 20 kHz, a power factor of 0.9 was found.

What is claimed is:
1. A circuit arrangement for feeding a discharge lamp, comprising
    input terminals to be connected to a pourer supply source supplying a low-frequency alternating voltage,
    rectifier means coupled to the input terminals for rectifying the low-frequency alternating voltage, and provided with a first output terminal and a second output terminal,
    a first branch comprising a series arrargement of a first buffer capacitance and a second buffer capacitance, and which interconnects said output terminals,
    a load branch comprising a series arrangement of a first inductive element and lamp clamps for electrically contacting a discharge lamp, and having a first end coupled to a common point of the two buffer capacitances,
    a first switching element coupled to the load branch,
    a second switching element coupled to the load branch,
    a control circuit coupled to a control electrode of the first switching element and to a control electrode of the second switching element for rendering the first switching element alternately conducting and non-conducting, while the second switching element is non-conducting, and for rendering the second switching element alternately conducting and non-conducting, while the first switching element is non-conducting,
    a first unidirectional element and a second unidirectional element coupled to the load branch,
    a third unidirectional element coupled between the first output terminal and the first buffer capacitance,
    a fourth unidirectional element coupled between the second output terminal and the second buffer capacitance,
    a second inductive element having a first end coupled to a first end of the first inductive element,
    a first capacitive element coupled between a first tapping point of the first inductive element and the second output terminal,
    a second capacitive element coupled between a tapping point of the second inductive element and the first output terminal, and wherein the first switching element is coupled between a second end of the first inductive element and a common point of the third unidirectional element and the first buffer capacitance, wherein the second switching element is coupled between a second end of the second inductive element and a common point of the fourth unidirectional element and the second buffer Capacitance, and wherein the first unidirectional element is coupled between the second end of the first inductive element and a common point of the fourth unidirectional element and the second buffer capacitance, and the second unidirectional element is coupled between the second end of the second inductive element and a common point of the third unidirectional element and the first buffer capacitance.

2. A circuit arrangement as claimed in claim 1, wherein a third inductive element is coupled between the first output terminal and the third unidirectional element.

3. A circuit arrangement as claimed in claim 1, wherein the clamps for electrically contacting a discharge lamp are connected to each other by means of a second branch comprising a third capacitive element.

4. A circuit arrangement as claimed in claim 1, wherein a fifth unidirectional element is coupled between the first output terminal and the second capacitive element, and a sixth unidirectional element is coupled between the second output terminal and the first capacitive element.

* * * * *